3,449,313
RECOVERY OF TALL OIL SOAPS FROM SULFATE PROCESS BLACK LIQUOR
Justin C. Bolger, Needham, and Alan S. Michaels, Lexington, Mass., assignors to Pulp Chemicals Association, New York, N.Y., an unincorporated trade association in New York
Filed Nov. 18, 1965, Ser. No. 508,427
Int. Cl. C09f *1/00;* C08h *11/00;* C11b *13/00*
U.S. Cl. 260—97.5                5 Claims

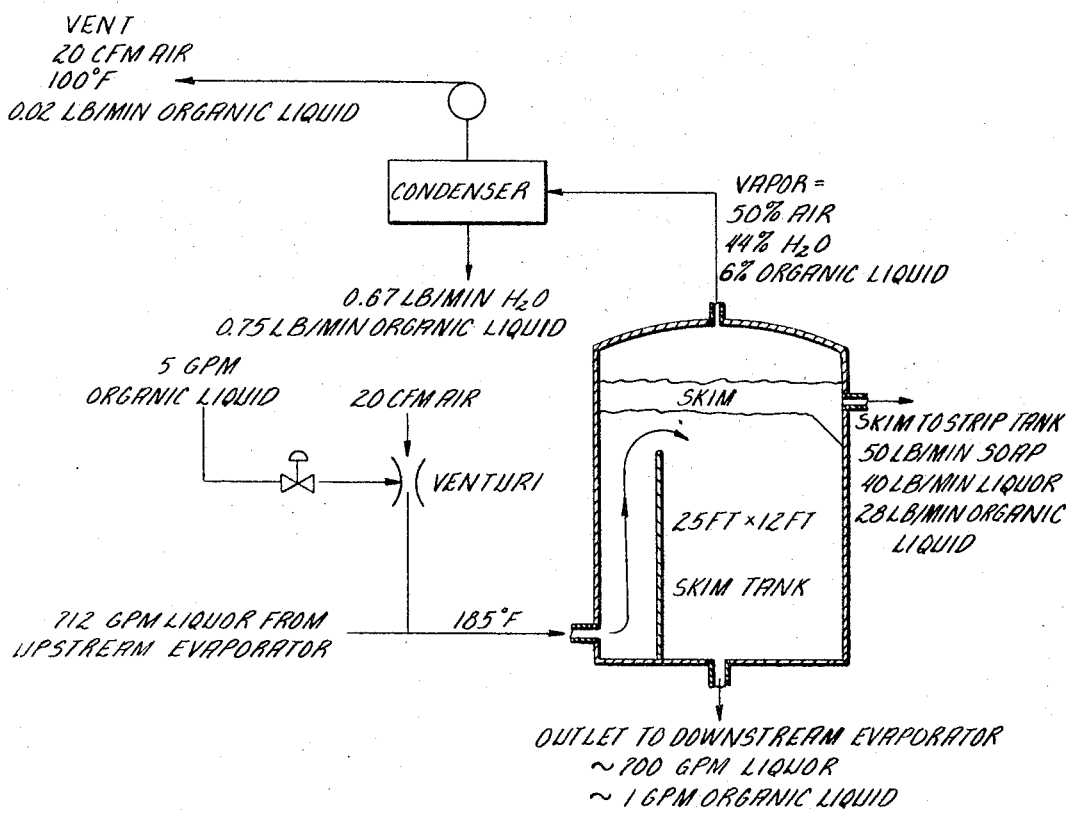

ABSTRACT OF THE DISCLOSURE

Recovery of tall oil from black liquor is increased by adding to the liquor from 0.1 to 5% by weight of a liquid hydrocarbon solvent containing at least 10% by volume of unsaturated cyclic compounds, the solvent being substantially immiscible in the black liquor, having a flash point within the range from 85°–185° F., a specific gravity less than 1.0 and being capable of dissolving less than 20% by weight of tall oil soap at room temperature.

---

This invention relates to methods of increasing the yield of tall oil in the skim tank method of separating tall oil during the manufacture of pulp by the sulfate process.

It is the object of this invention to economically increase the yield of tall oil by the addition to the black liquor of low-cost, liquid, organic flocculating agents.

It is a further object of this invention to further increase the yield of tall oil by adding to the black liquor, in combination with the addition of low-cost, liquid organic flocculating agents, varying amounts of entrained air and dehydrotroping salts.

In the sulfate process for the manufacture of wood pulp, the digesting and washing of the raw wood produces a heavy black liquor, which contains, among other things, varying amounts of causticizing and other process chemicals (e.g., NaOH, $Na_2S$, $Na_2$, $CO_3$, $Na_2SO_4$, $Na_2S_2O_3$), and certain organic material from the wood, present in both solid and dissolved forms such that the liquor is about 12% solids. Included in this solid portion is tall oil soap, a mixture of about 45% fatty acid soaps, 40% rosin soap, and 15% unsaponifiable material.

It has been customary to recover this tall oil soap by transferring the black liquor to a skim tank, at some point during the concenrtation of the black liquor, but prior to the final passage of the black liquor into the smelters to be burned. Most of the tall oil soap floats to the surface of the skim tank and is recovered therefrom by skimming off these surface solids. This skimming process, however, has proved ineffective to remove all of the tall oil present, and the solid remaining in the black liquor after skimming still contains up to about 0.7% tall oil on total weight of solids (determined by the method of Saltsman and Kuiken, TAPPI, 42, No. 11 (November 1959)). In addition to the obvious economic disadvantages of such waste, this inefficient recovery also necessitates further later skimming of the heavy liquor and increases fouling, foaming and scaling problems in the subsequent evaporation. On the other hand, the tall oil remaining does have use later as a fuel, since the heat produced in burning the organic liquor components is returned to the system.

Of the tall oil soap remaining in the black liquor, some is present in hydrotropic solution (caused by hydrotroping action of the liquor salts) while the remainder is present in micellar form or as other colloidal particles too small to separate out in a reasonable time.

In the past, recovery of the tall oil present in hydrotropic solution has been increased by adding to the black liquor a dehydrotroping agent, usually Glauber's salt. Since salt must be added to the liquor at some point prior to recycling the liquor, to compensate for chemicals lost in the digesting process and bring the liquor back to its original strength (usually make-up salt is added just before entry of liquor into the recovery furnace), this earlier addition need not increase the cost of tall oil recovery. On the other hand, this increase in electrolyte concentration results in increased scaling problems during subsequent evaporation of the black liquor.

So far as the colloidally suspended soap particles are concerned, conventional polymeric flocculating agents not only are prohibitively expensive but they are relatively ineffective in aiding the coagulation and separation of the soap particles, in the presence of high electrolyte concentrations.

The present invention makes use of certain low-cost, liquor-immiscible, hydrocarbon liquids as flocculating agents. The properties of the hydrocarbon liquid flocculating agent are critical. The liquid may be a mixture of various hydrocarbons, a large proportion of which may be saturated open-chain compounds. However, the mixture must contain at least 10% by volume of cyclic unsaturated hydrocarbons such as the pinenes, the terpenes, etc. as in the case of turpentine. Preferably the cyclic unsaturated hydrocarbon is aromatic in nature, i.e. is a substituted benzene such as toluene, o-, m-, or p-xylene, indene, indan, mestiylene, durene, ethylbenzene, cumene, p-cumene, or other alkyl-substituted benzene hydrocarbon containing up to 12 carbon atoms or mixtures thereof. The hydrocarbon liquid whether or not a mixture, must have a flash point within the range from 85° to 185° F. in order to present minimum fire hazard and to be capable of being stripped for reuse. The liquid must also be substantially immiscible in black liquor, i.e. be miscible to an extent less than about 1000 p.p.m. at room temperature, it must have little solvent power for tall oil soap i.e. must be capable of dissolving no more than about 20% by weight of tall oil soap at room temperature.

In the drawing, which is intended to illustrate more fully the nature of the present invention without acting as a limitation upon its scope.

FIG. 1 is a schematic flow sheet showing one embodiment of the present invention together with a recovery system for the organic liquid flocculant.

As shown in FIG. 1, the organic liquid is mixed with air prior to entry into the skim tank. Although mixing with air is not necessary to the essence of the invention, this use of the air flow has been found to facilitate the mixing of liquid with the liquor and also to increase the flotation of the solvent-aggregated soap particles, through attachment of air bubbles thereto. An air flow of 20 c.f.m. is given in FIG. 1 for illustrative purposes only. For a black liquor flow rate of about 500 g.p.m., air flow rates ranging from 5 to 50 c.f.m., have proved satisfactory; or, by volume, flow rates resulting in 10–100% air in the total mixture with organic liquid and black liquor by volume may be used, the typical composition being 50–70% air by volume. In any case, the flow rate of air is ultimately limited by the increase in pressure drop which can be tolerated through the inlet line. The temperature of 185° F. specified in FIG. 1 corresponds to a solids concentration of about 23–27%; the temperature will vary according to the solids concentration of the black liquor which is transferred to the skim tank, but usually it is in the range of 180°–190° F.

Although the tall oil separation may be carried out at solids concentrations from 23–45%, preferably the liquor should contain about 23–40% solids. If the liquor is too dilute, insufficient tall oil will separate, much remaining dissolved. The upper concentration limit is set by the need to have at least one evaporator effect downstream of the recovery point; this final evaporation stage serving to permit of any organic liquid flocculant which is entrained or dissolved in liquor leaving the skim tank.

Moreover, although the amount of organic liquid to be added for optimum results depends upon the individual process, and although 5% liquid on black liquor weight is a preferable maximum, it has been found that less than 1% and as little as 0.1% liquid on the black liquor weight results in recovery of virtually all tall oil in one skimming step, reducing the residual tall oil content of the black liquor to about 0.3% based on weight of total solids.

In order to minimize the cost of recovery, as well as to reduce the safety hazards involved in handling flammable liquids, and, additionally, to reduce contamination in the final tall oil product, arrangement should be made for the liquid to be stripped out of the process stream after leaving the skim tank and to be recycled. While the recovery scheme may vary, depending upon the operation of the individual skim tank and upon the particular organic liquid selected, the recovery system shown in the drawing, taking advantage of the fact that each of the preferred organic liquids is immiscible in water, depends on a simple steam-stripping of the liquid. The soap, liquid, and entrained liquor mixture is sent to the steam-stripping tank; the most suitable rate of steam flow depends on the nature of the liquid to be stripped, the temperature of the black liquor entering the skim tank, and the heat loss during skimming as will be evident to those skilled in the art. Usually the weight of steam required is of the order of 1.0 to 1.5 times the weight of material entering the strip bank. The stripped liquid and steam may then be sent to a separating tank, and the resultant overlying organic liquid layer allowed to overflow into the organic liquid storage tank for eventual recycling.

The tall oil yield from the strip tank may be further increased by adding make-up electrolytes, such as Glauber's salt (crude sodium sulfate decahydrate), at some point upstream of the skim tank. As previously discussed, the addition of such salts decreases the amount of tall oil soap which can remain hydrotropically dissolved; the additional soap which has been salted out is then recovered by the organic flocculants. Such salt addition has been found to decrease the amount of residual tall oil left in the black liquor after the skimming process with our organic flocculants, to 0.2% based on weight of total solids.

It has been found that the combination of the salt addition method with the organic flocculant method substantially eliminates the increased scaling problem caused by the former method alone. The severity of the scaling problem during subsequent evaporation of the black liquor has been found to be approximately proportional to the total solids content of the liquor. When salt alone is added to the black liquor, the additional amount of tall oil soap which separates is less than the amount of salt added, so that the total solids concentration of the black liquor is increased. However, when the salt is used in combination with the organic liquid flocculant (which is separated from the black liquor along with the tall oil soap in the skim tank), the amount of salt added need not exceed the total additional amount of tall oil soap separated as the result of both the organic liquid flocculant and the salt, so that the total solids content of the black liquor discharge from the skim tank is not increased. Since the total additional amount of tall oil soap separated (above the amount which would separate without the use of either organic liquid flocculant or of salt) is at most about 0.65% by weight of the black liquor; the amount of salt added preferably should not exceed this amount in order to avoid increasing the scaling problem. In the usual case, the black liquor skim tank discharge contains about 0.65% by weight of tall oil soap; however, the combination of organic liquid flocculant and salt causes separation of approximately 0.55%, so that the amount of salt added preferably does not exceed 0.55% by weight of the black liquor.

The additional tall oil soap separated from black liquor by means of the organic liquid flocculants of the present invention was found to be substantially identical in composition with that which separates from the liquor during evaporation without the use of any organic liquid or salt.

Example 1

Twenty-five parts by weight of a sample of skim tank feed containing 24.4% solids and 2.4% tall oil, based on total solids, at 180° F., were mixed with approximately 0.32 part of an aromatic solvent containing a mixture of alkyl benzenes in which the alkyl groups contained from one to three carbon atoms (Solvesso-100), and agitated for 60 sec. by a propeller stirrer, permitting the entrainment of air in the liquid. After agitation, the sample was placed in a 180° F. air oven and allowed to stand undisturbed for 15 minutes. An identical sample was treated to the same agitation and settling process, but without the addition of solvent. After 15 minutes the sample treated with solvent had a dense, oily phase on the top surface, consisting of tall oil soap, solvent, and entrained black liquor, while the sample without solvent had relatively little separate phase on the surface. Analysis of samples removed from the lower black liquor portion of each sample revealed that the one containing no solvent contained about 0.62% tall oil on total solids, while the sample which had been treated with solvent contained only 0.31% tall oil. The procedure was repeated with several other liquids. The results are summarized below:

| Additive: | Percent tall oil on total solids remaining in black liquor |
|---|---|
| Crude sulfate turpentine | 0.21 |
| Toluene | 0.28 |
| Solvesso-100[1] | 0.31 |
| Coal tar creosote | 0.35 |
| Chlorobenzene | 0.39 |

[1] Solvesso-100.—A hydrocarbon solvent containing 98% by volume $C_8$–$C_{11}$ aromatics, having a flash point of 113° F., a boiling point range of 318°–359° F., and a specific gravity of 0.87.

Although chlorobenzene appears effective, it has the serious disadvantages that the soap-chlorobenzene skin sinks to the bottom of the liquor and that chlorobenzene is of prohibitive cost. On the other hand, when pure aliphatic solvents or solvents containing a mixture of aliphatic and naphthalenic components were used, results indicated that from 0.5 to 0.62% tall oil on total solids remained in the black liquor.

Example 2

To determine the effect of salt addition, prior to adding the organic liquid, 4.2 parts by weight of Glauber's salt was added to 250 parts of a sample of skim tank feed, an amount of salt approximating that amount that would be added further downstream before the smelter to make up for process losses. The sample was then further treated with 1% toluene, agitated, and allowed to stand in a 180° oven, following the porcedure of Example 1. Three other samples were also prepared, one containing only skim-tank feed liquor, one containing skim-tank feed liquor and salt only, and the third containing skim-tank feed liquor and toluene only, and agitated and heated as above. Analysis of liquor taken after 15 minutes from the bottom of each portion gave the following results:

| Sample: | Percent tall oil on total solids remaining in black liquor |
|---|---|
| Untreated | 1.01 |
| Salt addition only | .61 |
| Toluene addition only | .30 |
| Salt and toluene addition | .20 |

Example 3

To determine how small an amount of organic liquid is sufficient for removal of tall oil, varying amounts of Solvesso-100 were adedd to 300 ml. samples of skim tank feed. It was found that a 1 ml. sample of Solvesso-150[1] was approximately as effective as the identical amount of Solvesso-100.

| Ml. Solvesso-100 added to 300 ml. liquor: | Residual tall oil in liquor (percent on total solids) |
|---|---|
| None | 1.39 |
| 5 ml. | 0.207 |
| 4 ml. | 0.261 |
| 1 ml. | 0.281 |
| 1 ml. Solvesso-150 | 0.287 |

Other embodiments will occur to those skilled in the art and are within the following claims.

What is claimed is:

1. In the sulfate process for the manufacture of paper pulp which comprises concentrating the black liquor by evaporation and separation of tall oil soap from the black liquor by skimming, the step which comprises adding to the black liquor, prior to said separation, from 0.1% to 5% by weight of a liquid hydrocarbon solvent containing at least 10% by volume of unsaturated cyclic compounds, said solvent being substantially immiscible in said black liquor, having a flash point within the range from 85°–185° F., a specific gravity less than 1.0 and being capable of dissolving less than 20% by weight of tall oil soap at room temperature.

2. The process claimed in claim 1 wherein said liquid is crude turpentine.

3. The process claimed in claim 1 in which there is introduced into the black liquor prior to said separation from 10% to 100% by volume of air to accelerate the separation of the tall oil soap by air flotation.

4. The process claimed in claim 1 in which make-up salt is introduced into the black liquor prior to said separation.

5. The process claimed in claim 1 in which said liquid is crude turpentine, and there is also introduced into the black liquor prior to said separation both make-up salt and from 10% to 100% by volume of air to accelerate the separation of the tall oil soap by air flotation.

References Cited

UNITED STATES PATENTS

| | | | |
|---|---|---|---|
| 1,005,882 | 10/1917 | Rinman | 260—97.7 |
| 2,200,468 | 5/1940 | Cirves | 260—97.5 |
| 2,334,762 | 11/1943 | Hasselstrom | 260—97.5 |
| 2,717,890 | 9/1955 | Drechsel | 260—97.6 |

OTHER REFERENCES

Collins et al.: "Paper Industry and Paper World," December, 1944 (copy in group 140) (page 1136 relied on)

DONALD E. CZAJA, *Primary Examiner.*

WILLIAM E. PARKER, *Assistant Examiner.*

U.S. Cl. X.R.

260—97.6

---

[1] Solvesso-150.—A hydrocarbon solvent containing 90.8% by volume of $C_9$–$C_{12}$ aromatics and 6.5% of naphthalenes, having a flash point of 151° F., a boiling point range of 364°–416° F., and a specific gravity of 0.89.